United States Patent Office 3,380,466
Patented Apr. 30, 1968

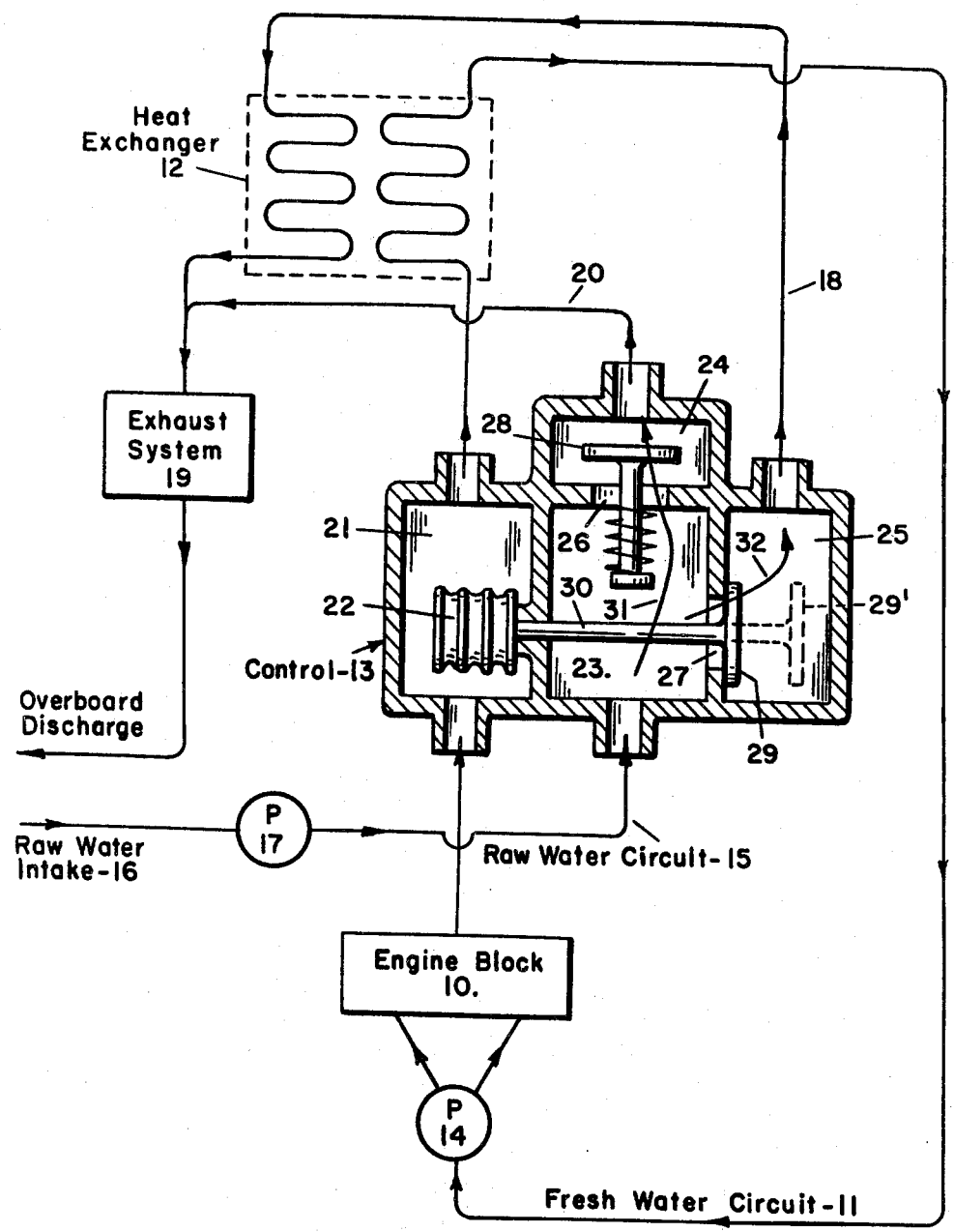

3,380,466
THERMOSTATIC BY-PASS VALVES
Salvatore S. Sarra, Miami, Fla., assignor to The Daytona Marine Engine Corporation, Daytona Beach, Fla.
Filed Feb. 14, 1966, Ser. No. 527,125
1 Claim. (Cl. 137—87)

ABSTRACT OF THE DISCLOSURE

A valve housing having a flow chamber for first coolant containing a thermostat. The housing also has inlet, outlet and by-pass chambers for a second coolant, with outlet and by-pass valve ports therebetween. An outlet valve actuated by the thermostat cooperates with the outlet valve port to control flow of the second coolant from the inlet to the outlet chamber. A spring-biased pressure relief valve cooperates with the by-pass valve port to divert flow of second coolant from the inlet to the by-pass chamber when the outlet valve is closed.

---

This invention relates to new and useful improvements in cooling systems for internal combustion engines, and while the teachings of the invention are applicable to water or other liquid cooled engines in general, the invention primarily concerns itself with marine engines which employ both fresh water and sea water as coolants.

In the art of marine engine cooling it is a common practice to provide a closed fresh water circuit for cooling the engine block, along with an open sea water or raw water circuit through a heat exchanger which transfers heat from the fresh water to the sea water, thus avoiding the necessity of passing corrosive sea water through the block of the engine. Of course, proper temperature of the closed fresh water circuit has to be maintained in accordance with the operating requirements of the engine, and it has become conventional in the art to maintain such temperature by controlling the rate of flow of the fresh water through the heat exchanger by thermostatic valve means operating within the fresh water circuit itself. This, however, presents some difficulties in that the temperature control inherently results in restrictions of the rate of fresh water flow, so that it is not possible to keep the fresh water circuit in circulation at its full capacity at all times during operation of the engine.

It is, therefore, the principal object of the invention to eliminate this disadvantage, this being achieved by providing, in a cooling system of the character described, means whereby the fresh water coolant is at all times circulated at its full capacity without any flow restriction, and whereby the fresh water temperature is efficiently controlled by varying the rate of sea water flow through the heat exchanger.

As such, the cooling system of the invention provides a closed fresh water circuit with unrestricted circulation through the heat exchanger and engine block, a raw water circuit which selectively passes through and by-passes the heat exchanger to an overboard discharge, and an automatic control comprising thermostatic valve means which regulates the rate of raw water flow through the heat exchanger by diversion thereof through the heat exchanger by-pass. While the valve portion of the thermostatic valve means is disposed in the raw water circuit, the thermostat portion thereof is disposed in the fresh water circuit without imposing any restriction on fresh water flow, and is operatively connected to the valve portion so that it is possible to maintain a flow of fresh water through the engine block at full capacity while the fresh water temperature is regulated, in accordance with operating requirements of the engine, by controlling the rate of raw water flow through the heat exchanger.

With the foregoing more important object and features in view and such other objects and features as may become apparent as this specification proceeds, the invention will be understood from the accompanying drawing in conjunction with the following description.

The drawing shows, mostly in a diagrammatic form, the cooling system of the invention.

Referring now to the accompanying drawing in detail, the numeral 10 designates a block of a marine engine, while 11 designates a fresh water or other liquid coolant circuit which circulates in a closed, continuous manner through the engine block 10, through a heat exchanger 12 and through a control 13 of the invention under the action of a circulating pump 14.

The raw or sea water circuit 15 is an open circuit which has a raw water intake 16 connected to a pump 17 which forces the raw water through the control 13, for selective passage by that control either or both through a line 18 and the heat exchanger 12 to the overboard discharge of the engine exhaust system 19, or through a by-pass line 20 which by-passes the heat exchanger and leads directly to the exhaust system overboard discharge, as will be readily apparent.

The control 13 preferably assumes the form of a housing which is provided with a fresh water circuit chamber 21, a thermostat 22 being provided in that chamber for response to changes in temperature of the fresh water but without affecting the flow of fresh water through the chamber. The control housing also provides a raw water inlet chamber 23, a by-pass chamber 24 and a raw water outlet chamber 25, the chambers 24 and 25 communicating with the inlet chamber 23 through suitable ports 26, 27, respectively.

A suitable pressure relief valve 28 is provided to cooperate with the port 26 so that if abnormal pressure of raw water should build up in the inlet chamber 23 by the action of the pump 17, such pressure may be relieved by flow of the raw water through the by-pass chamber 24 and by-pass line 20 directly to the overboard discharge 19. Also, a flow control valve 29 is provided for cooperation with the port 27 between the raw water inlet chamber 23 and the outlet chamber 25, the valve 29 being actuated as through an operative connection 30 by the thermostat 22 so that the valve 29 opens and closes respectively in response to rising and lowering temperature of fresh water passing through the chamber 21. Thus, it will be apparent that as the flow control valve 29 opens, more raw water will flow through the heat exchanger 12 than through the by-pass line 20, and vice versa when the valve 29 closes.

In operation, when the engine is running at a cold or relatively cool temperature, the thermostat 22 in the fresh water circuit 11 will cause the valve 29 to be fully closed or slightly open, thus building up a pressure of raw water under the action of the pump 17 in the raw water inlet chamber 23. When this raw water pressure is sufficient to overcome the spring bias of the pressure relief valve 28, the latter will open to permit flow of raw water from the chamber 23 into the chamber 24 as indicated at 31 and through the by-pass line 20 to the overboard discharge 19. In the meantime, the fully or partially closed valve 29 will permit little or no raw water to pass through the chamber 25 and line 18 to the heat exchanger 12, since under the conditions described there is no need for exchange of heat between the fresh water and raw water circuits.

However, as the engine operating temperature increases with a corresponding temperature increase of the fresh water circuit 11, the thermostat 22 will cause the valve 29 to open to a greater and greater extent, thus permitting more and more raw water to flow from the inlet chamber 23 into the outlet chamber 25 and through the line 18 to the heat exchanger 12, in order to afford an appropriate transfer of heat from the fresh water circuit to the raw water circuit and maintain the fresh water circuit at a proper temperature to suit the operational requirements of the engine. It will be noted that with greater and greater opening of the valve 29, the raw water pressure in the inlet chamber 23 will be progressively decreased, thus causing progressive closing of the pressure relief valve 28 and a corresponding restriction on the diversion of raw water flow through the by-pass line 20 to the overboard discharge. For illustrative purposes, the flow of raw water through the valve 29 is indicated at 32, the dotted lines 29' showing the valve in its open position.

It is significant to note that regardless of whether the valve 29 is closed or partially or fully open, the circulation of fresh water in the fresh water circuit 11 is at full capacity of the fresh water pump 14 so that full flow and pressure of fresh water are maintained through the engine block 10, entirely independent of temperature conditions, the fresh water temperature being controlled selectively and automatically by passage of raw water through the heat exchanger 12 or diversion thereof through the by-pass 20 in response to fresh water temperature variations as sensed by the thermostat 22.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

I claim:
1. A thermostatic by-pass valve for engine cooling systems utilizing separate flow paths for two different coolants, said valve comprising in combination, a valve housing provided with a first coolant flow chamber having intake and discharge openings, said housing also being provided with a second coolant inlet chamber, a second coolant outlet chamber and a second coolant by-pass chamber, an outlet valve port and a by-pass valve port communicating said inlet chamber with said outlet and by-pass chambers respectively, a thermostat positioned in said first coolant flow chamber, an outlet valve operatively connected to said thermostat and cooperating with said outlet valve port for controlling flow of second coolant from the inlet to the outlet chamber in response to temperature changes in the first coolant flow chamber, a pressure relief valve cooperating with said bypass valve port, and resilient means biasing said pressure relief valve to its closed position when said outlet valve is substantially open, said pressure relief valve being opened against the action of said resilient means by pressure of second coolant in said inlet chamber when said outlet valve is substantially closed, whereby to divert flow of second coolant from the inlet to the by-pass chamber.

References Cited
UNITED STATES PATENTS

| | | | |
|---|---|---|---|
| 2,447,970 | 8/1948 | Wareing | 236—34.5 XR |
| 3,323,502 | 6/1967 | Whalen | 123—41.09 XR |
| 2,377,028 | 5/1945 | Nicholas | 123—41.09 |
| 2,392,723 | 1/1946 | Chandler | 123—41.08 |
| 2,428,373 | 10/1947 | Lloyd | 123—41.09 X |
| 3,125,081 | 3/1964 | Jasper | 123—41.09 |

CARLTON R. CROYLE, *Primary Examiner.*